United States Patent
Gustafsson et al.

(10) Patent No.: US 8,209,038 B2
(45) Date of Patent: Jun. 26, 2012

(54) SYSTEM AND METHOD FOR RADIO NETWORK PLANNING WITH HSDPA ANALYSIS

(75) Inventors: Nils Anders Stefan Gustafsson, The Hague (NL); Remco Litjens, Voorschuten (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 213 days.

(21) Appl. No.: 12/301,971

(22) PCT Filed: May 23, 2007

(86) PCT No.: PCT/NL2007/050244
§ 371 (c)(1),
(2), (4) Date: Oct. 27, 2010

(87) PCT Pub. No.: WO2007/136270
PCT Pub. Date: Nov. 29, 2007

(65) Prior Publication Data
US 2011/0032831 A1    Feb. 10, 2011

(30) Foreign Application Priority Data
May 23, 2006  (EP) .................................. 06076098

(51) Int. Cl.
*G05B 13/02* (2006.01)
(52) U.S. Cl. ................ 700/30; 703/4; 700/100
(58) Field of Classification Search .............. 700/30, 700/100, 291, 292; 703/4
See application file for complete search history.

(56) References Cited

U.S. PATENT DOCUMENTS

| | | | |
|---|---|---|---|
| 6,810,246 B1 | 10/2004 | Kalofonos et al. | |
| 2002/0156542 A1* | 10/2002 | Nandi | 700/30 |
| 2005/0055196 A1 | 3/2005 | Cohen et al. | |
| 2008/0058975 A1* | 3/2008 | Visuri et al. | 700/100 |
| 2008/0077368 A1* | 3/2008 | Nasle | 703/4 |

OTHER PUBLICATIONS

Turke U et al: "HSDPA Performance Analysis in UMTS Radio Network Planning Simulations" Vehicular Technology Conference, 2004. VTC 2004—Spring. 2004 IEEE 59th Milan, Italy May 17-19, 2004, Piscataway, NJ, USA, IEEE, US, vol. 5, May 17, 2004, pp. 2555-2559.

Olin B et al: "A novel approach to WCDMA radio network dimensioning" Vehicular Technology Conference, 2004. VTC2004—Fall. 2004 IEEE 60th Los Angeles, CA, USA Sep. 26-29, 2004, Piscataway, NJ, USA, IEEE, Sep. 26, 2004, pp. 3443-3447.

International Search Report for PCT/NL2007/050244 dated Jul. 9, 2007.

* cited by examiner

*Primary Examiner* — Ricky Ngo
*Assistant Examiner* — Phuongchau B Nguyen
(74) *Attorney, Agent, or Firm* — Leydig, Voit & Mayer, Ltd.

(57) ABSTRACT

A system and method for radio network planning comprises a grid generator and a Monte Carlo analysis module. The Monte Carlo analysis module comprises a snapshot generation module which draws, for each snapshot and for each pixel, a statistical realization from a distribution function relating to slow fading, and a snapshot evaluation module which establishes radio network parameters. The Monte Carlo analysis module further comprises a sub-snapshot generation module which generates at least one sub-snapshot for each evaluated snapshot result, and a sub-snapshot evaluation module (14) for evaluating HSDPA performance parameters based on the sub-snapshot. The sub-snapshot evaluation module (14) comprises a scheduler module (16) which is arranged for scheduling a HSDPA user according to a scheduling scheme.

21 Claims, 5 Drawing Sheets

SYSTEM AND METHOD FOR RADIO NETWORK PLANNING WITH HSDPA ANALYSIS

FIELD OF THE INVENTION

The invention relates to a system and method for radio network planning with HSDPA analysis.

BACKGROUND OF THE INVENTION

As 3G networks are rolled out in many parts of the developed world, vendors and operators are already working on improvements. Especially, improvements are made in the download speed, achieving near theoretical speeds. The next evolutionary step to UMTS is HSDPA, High Speed Downlink Packet Access. This technology will provide a substantial improvement of throughput, latency and capacity in the downlink of a UMTS network. Similarly in CDMA2000 networks a new generation of fast downlink data access is known as EV-DO (Evolution Data Optimized) and EV-DV (Evolution Data and Voice). In this document the acronym HSDPA is used for all types of high speed downlink solutions in various radio networks like UMTS and CDMA2000.

Since the radio access network is the most complex and expensive part of a mobile network, it has to be carefully designed. Operators use radio network planning tools for this purpose. For the analysis with respect to the roll-out and optimization of CDMA based radio networks such as UMTS, usually Monte Carlo simulators are used. Alternatively analytical methods or fully dynamic simulators are known. In the trade-off between accuracy and speed, Monte Carlo simulators offer a useful and regularly applied option. While preparing for the roll-out of HSDPA, mobile operators require HSDPA simulators. Already some HSDPA simulation tools are available.

Known solutions for HSDPA analyses in planning tools are based on determining for each terminal the HSDPA attainable bit-rate given the average signal-to-noise ratio (SNR). This approach demonstrates if an HSDPA connection is at all possible at a certain bit-rate, but does not take into account the presence of other HSDPA users in the same cell, nor channel dependent scheduler effects, nor fast fading, etc. The tool disclosed in the paper "HSDPA Planning & Deployment" by Lutz Rabe, Cell Planning Forum 2005, Vienna, June 2005, appears to be based upon this approach.

In a more advanced way, as disclosed in the paper "A Novel Approach to WCDMA Radio Network Dimensioning" by B. Olin, H. Nyberg, M. Lundevall, VTC2004-Fall, p. 3443-3447, September 2004, the effect of fast fading is included in the analysis, by drawing samples in a fast fading distribution function for a single user. Thus the instantaneous SNR is estimated instead of the average SNR, and a distribution function for the bit-rate can be estimated. This method however does not take other HSDPA users into account. Furthermore the interaction between the non-HSDPA UMTS traffic (DCH connections) and the HSDPA traffic is taken into account in a very limited way. The method of the paper by Olin et al. seems purely aimed at network dimensioning and therefore assuming a regular network layout with a spatially homogenous traffic demand. This will not be sufficient for network planning purposes, since no other users are taken into account.

Another known solution shows a combination of a Monte-Carlo simulator for "normal" UMTS connections and a dynamic simulator for HSDPA-connections. A different version of this concept is described in the paper "HSDPA performance analysis in UMTS radio network planning simulations" by U. Turke, M. Koonert, R. Schelb, and C. Gorg, Vehicular Technology Conference, May 2004, and the paper "Optimizing HSDPA Performance in the UMTS Network Planning Process" by J. Voigt, J. Reissner, J. Hübner, D. Hunold, S. Möbius, VTC 2005-Spring, p. 2384-2388, May-June 2005. The effects of fast fading and the scheduler operation—both crucial for HSDPA—can thus be studied in detail. The disadvantage of this approach is that large amounts of CPU time is required for the HSDPA calculations, rendering the use for radio network operators in practice very limited. This disadvantage can be reduced by dynamic simulation in short time slices.

In the above mentioned prior art, for each snapshot first the DCH-connections are evaluated in a first step and afterwards the HSDPA-connections are simulated in a second step. The outcome of the first step is the starting point for the second step. In radio network practice however it is possible that an HSDPA-connection does not require all available power. The available transmission power is then reduced to avoid the occurrence of radio interference. None of the above methods take this into account. This causes potentially large discrepancies in the prediction and the actual performance of WCDMA networks in the early stage of roll-out.

SUMMARY OF THE INVENTION

It is an object of the invention to provide a mobile radio planning system and method with HSDPA analysis, which is efficient, fast and accurate enough to take into account all essential features of HSDPA, comprising at least the presence of multiple terminals in a cell.

This object may be achieved, according to a first aspect of the invention, by a system for radio network planning comprising:
at least one grid generator, arranged for generating a map of pixels, each pixel representing a radio network area having at least one of a plurality of radio network input parameters, which parameters represent a radio network having at least one cell and at least one user,
a Monte Carlo analysis module, which may comprise
a snapshot generation module, arranged for generating a plurality of snapshots, each snapshot comprising the map of pixels, and wherein for each snapshot and for each pixel a statistical realisation is drawn from a distribution function at least relating to slow fading,
a snapshot evaluation module, arranged for evaluating radio network performance parameters for each pixel of the plurality of snapshots,
a sub-snapshot generation module arranged for generating at least one sub-snapshot for each evaluated snapshot result, wherein a statistical realisation is drawn from a distribution function relating to fast fading within the snapshot,
a sub-snapshot evaluation module for establishing HSDPA performance parameters based on the sub-snapshot,
wherein the sub-snapshot evaluation module comprises a scheduler sub-module arranged for scheduling a user according to a scheduling criterion.

The power balancing loop in the snapshot evaluation module is typically one of the most complex parts of a UMTS Monte Carlo analysis module in terms of computational complexity. Furthermore, the computational complexity grows exponentially with the number of simulated users in a snapshot. Therefore, for high density scenarios, Monte Carlo analysis modules are typically very slow. In the proposed sub-snapshot evaluation module, the complexity grows linearly with the number of simulated users. Furthermore, the calculations themselves are very simple when compared to the power balancing loop of the snapshot evaluation module. The sub-snapshot evaluation module may further comprise a resource requirements sub-module for establishing for the at least one user at least one HSDPA resource requirement. For both the snapshot evaluation module and the sub-snapshot evaluation module it holds that the computational complexity increases linearly with the number of (sub-)snapshots.

Altogether, the sub-snapshot evaluation module adds very little computational complexity to a Monte Carlo analysis module. This provides a substantial advantage in both high and low HSDPA-density scenarios:

An advantage of the proposed system is that in a high HSDPA density scenario the HSDPA analysis is done with negligible additional complexity.

In a low HSDPA density scenario, the concept of sub-snapshots is extra beneficial since additional simulation data can be generated for HSDPA users with very little extra effort. Without using sub-snapshots, it would be necessary to simulate a much larger number of snapshots just in order to produce sufficient HSDPA results.

The introduction of the scheduling sub-module allows a plurality of users to be simulated. Simulating a draw from a user density (traffic) function, allowing more than one user, and evaluating HSDPA performance parameters greatly enhances the accuracy and reliability of the simulation and allows for accurate network planning. Scheduling may take place at distinct moments in time. A user may be scheduled for transmission of data according to the resource requirements present at such distinct moments in time.

In an embodiment according to the first aspect of the invention, the sub-snapshot evaluation module comprises a resource requirements sub-module for establishing at least one HSDPA resource requirement for the at least one user, and wherein the scheduling criterion of the scheduling sub-module comprises the HSDPA resource requirement. This has the advantage that scheduling of users can take place on the basis of the availability of HSDPA resources, such as HSDPA power or available codes, etc.

In an embodiment according to the first aspect of the invention, wherein the scheduler sub-module is further arranged to establish a ranking of the users before scheduling according to a scheduling scheme, and wherein the scheduler sub-module is further arranged for scheduling the user according to the ranking, the accuracy and flexibility is further improved. This allows for different types of cells and users, each with different system requirements to be simulated. Any scheduling algorithm can be applied. In a scheduling scheme a user may not be scheduled for transmission due to non compliance with the scheme or requirements.

In an embodiment according to the first aspect of the invention, the at least one HSDPA resource requirement comprises a required HSDPA power. This is the first feasible requirement for scheduling. This allows simple scheduling on a power division basis. It improves configuration and optimisation of the radio network. When there is little HSDPA power, there is no optimal use of HSDPA functionality, when there is too much HSDPA power, non-HSDPA users will not gain access to the radio network. The HSDPA resource requirements may also comprise OVSF codes, also known as channelisation codes, representing a transmission channel in a cell to a user. Another HSDPA resource requirement may also be gross bit rate.

In an embodiment according to the first aspect of the invention, the snapshot generation module draws a statistical realisation for each pixel from a user density distribution function, thus allowing simulation of traffic variations. In an embodiment according to the first aspect of the invention, the snapshot generation module draws a statistical realisation for each pixel from a slow fading distribution function.

In an embodiment according to the first aspect of the invention, the sub-snapshot evaluation module is further arranged for applying minimum inter-TTI terminal effects. This has the advantage that it enables cell performance evaluation and thereby radio network dimensioning. This has a further advantage that only HSDPA terminals that can be served on sub-snapshot basis participate in the HSDPA evaluation, which give improved accuracy.

In an embodiment according to the first aspect of the invention, the sub-snapshot evaluation module further comprises an inter-TTI interval sub-module for applying minimum inter-TTI terminal effects, the results of which are used by the scheduler sub-module. This way, terminal effects can be taken into account when scheduling users, thereby further enhancing simulation accuracy.

In an embodiment according to the first aspect of the invention, the sub-snapshot evaluation module further comprises a net bit-rate calculation sub-module, for calculating the net bit-rate for all HSDPA users. This way an aggregate net bit-rate for all scheduled users can be established.

In an embodiment according to the first aspect of the invention, the sub-snapshot evaluation module is arranged to feed back the used resources into the snapshot evaluation module and re-evaluate the snapshot related performance parameters. This has the advantage that extra DCH users can be scheduled if HSDPA power is unused, rendering the simulation more realistic.

In another embodiment according to the invention, the snapshot evaluation module comprises a state machine sub-module for establishing an evaluation state per cell in the snapshot depending on the number of HSDPA users and the HSDPA power limits in the cell.

The object may also be achieved, according to a second aspect of the invention, by a method for radio network planning, which may comprise the steps of:

generating at least one map of pixels each pixel representing a radio network area having at least one of a plurality of radio network input parameters, the input parameters representing a radio network having at least one of a cell and a user, performing Monte Carlo analysis on the at least one map of pixels, the Monte Carlo analysis comprising the steps of:

generating a plurality of snapshots, wherein for each snapshot of the plurality of snapshots a statistical realisation is drawn from a distribution function at least relating to slow fading, evaluating each of the plurality of snapshots, by establishing radio network performance parameters for each pixel of the plurality of snapshots, generating for each snapshot of the plurality of snapshots at least one sub-snapshot, wherein a statistical realisation is drawn from a distribution function relating to fast fading in the snapshot, evaluating each of the plurality of sub-snapshots, by establishing HSDPA performance parameters based on the sub-snapshot, wherein the step of Monte Carlo analysis further comprises scheduling each user according to a scheduling criterion.

In an embodiment according to the second aspect of the invention, the step of sub-snapshot evaluation further comprises establishing for the at least one user at least one HSDPA resource requirement, and wherein the scheduling criterion comprises the at least one HSDPA resource requirement.

In an embodiment according to the second aspect of the invention, the step of scheduling further comprises establishing a ranking of the users before scheduling according to a scheduling scheme, and scheduling each user according to the ranking.

In an embodiment according to the second aspect of the invention, the step of sub-snapshot evaluation further comprises determining the HSDPA power requirements for each cell in the sub-snapshot. In an embodiment according to the second aspect of the invention, the at least one HSDPA resource requirement comprises a required HSDPA power.

In an embodiment according to the second aspect of the invention, the step of snapshot generation comprises the step of drawing a statistical realisation for each pixel from a user density distribution function.

In an embodiment according to the second aspect of the invention, the step of snapshot generation comprises drawing a statistical realisation for each pixel from a slow fading distribution function.

In an embodiment according to the second aspect of the invention, the step of sub-snapshot evaluation further comprises applying minimum inter-TTI terminal effects, the results of which are used by the scheduler sub-module.

In an embodiment according to the second aspect of the invention, the step of sub-snapshot evaluation further comprises the step of calculating net bit-rate for all HSDPA users.

In an embodiment according to the second aspect of the invention, the step of sub-snapshot evaluation comprises feeding back the used resources into the snapshot evaluation module and re-evaluating the snapshot related performance parameters.

In an embodiment according to the second aspect of the invention, the step of snapshot evaluation further comprises establishing an evaluation state per cell in the snapshot depending on the number of HSDPA users and the HSDPA power limits in the cell.

The object may also be achieved, according to a third aspect of the invention, in a computer readable medium comprising a computer executable program, which program when loaded and executed in a computer is fit for performing the steps of the above described method.

BRIEF DESCRIPTION OF THE DRAWINGS

The drawings may apply to both a system and method for radio network planning. The system comprises the blocks as modules, the method comprises the blocks as corresponding steps.

DETAILED DESCRIPTION OF THE INVENTION

Overview of Monte Carlo-Based CDMA Network Planning

In the description below the terms UMTS and CDMA may be used interchangeably. UMTS can be considered as a CDMA implementation. The description should apply to all CDMA implementations. In this specification, the term user or active user refers to a representation of an active mobile terminal or mobile communication device. Examples of such users are mobile phones, personal digital assistants (PDA's) or portable computers equipped for voice and data communication in a radio network. A user is deemed to be active or in operation. The term HSDPA, again, is used as a more generalised term indicating high speed downlink solutions for CDMA networks.

Figure 1:
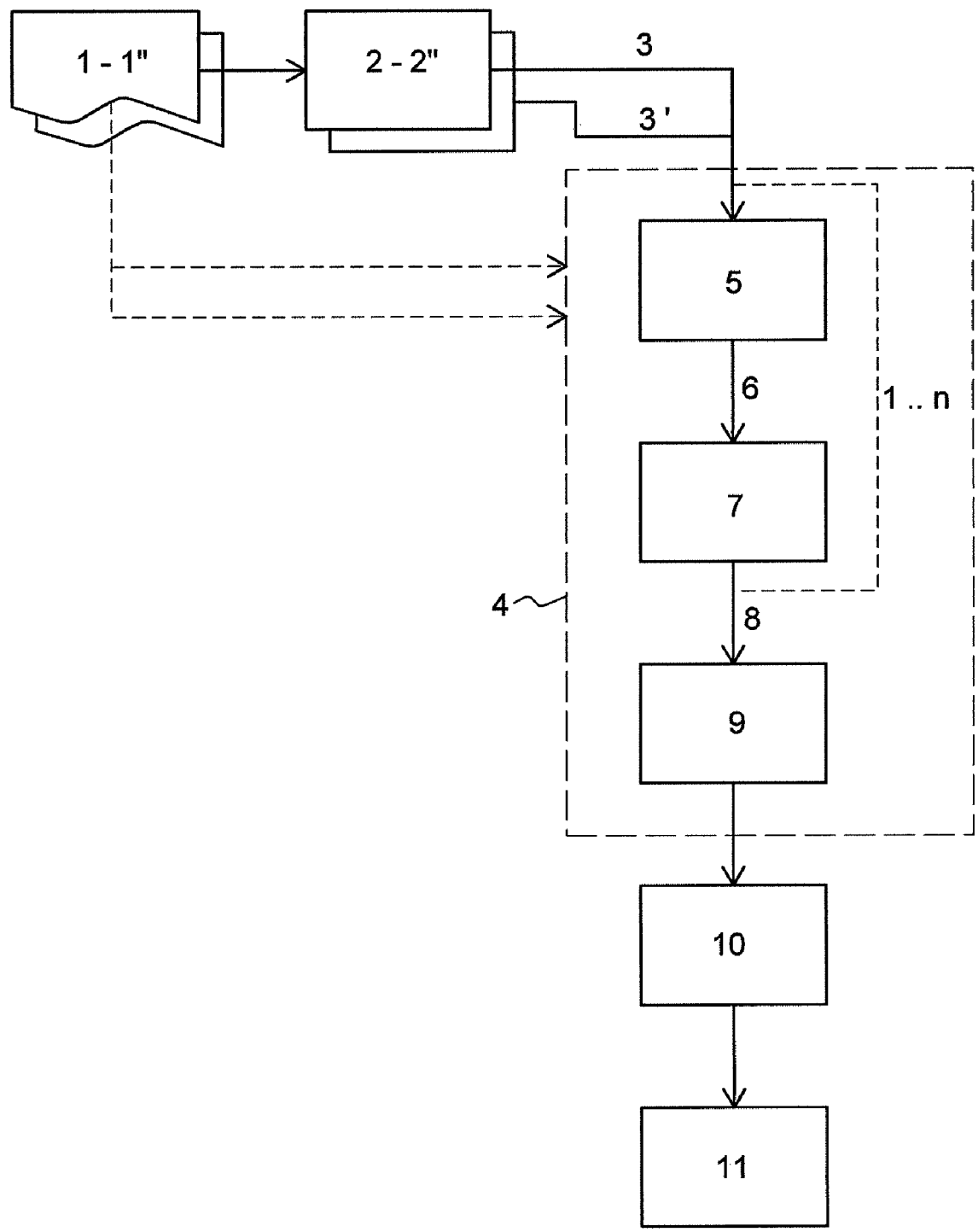
FIG. 1 shows a generalised block diagram of a system and method for radio network planning according to the state of the art.

FIG. 1 shows a generalised block diagram of a system for radio network planning according to the state of the art. Boxes 1-1" represent at least one set of radio network input parameters. These input parameters are used in at least one pre-processing module 2-2", which generates a at least one pixel map 3-3" based on the input parameters 1-1" for use in a Monte Carlo analysis module 4, where snapshots 6 are generated by a snapshot generator 5 by statistically sampling a distribution function in a subset of the at least one input parameter in the at least one pixel map 3-3". A pixel represents a geographical area with a size and a position, having properties relating to the input parameters 1-1". The input parameters 1-1" are described in more detail below. The at least one pixel map 3-3" as a whole may contain network related properties based on the input parameters 1-1" representing for example a country, a province, a state, a city, etc. The map can be two-dimensional, but in more advanced systems the map can be pseudo-three dimensional as well, like a curved plane, or fully three dimensional, where each pixel represents a space.

A snapshot evaluation module 7 evaluates the snapshots 6. The various snapshot evaluation results 8 or performance measures relating to pixels, cell information or user information within the input parameters 1-1" are collected by a collection module 9 and once sufficient independent snapshots 6 are generated and evaluated, these snapshot evaluation results 8 are post-processed by a post-processing module 10 to provide performance plots and statistics that are useful for the network planner and can be output by an output module 11, for example a display.

Figure 2:
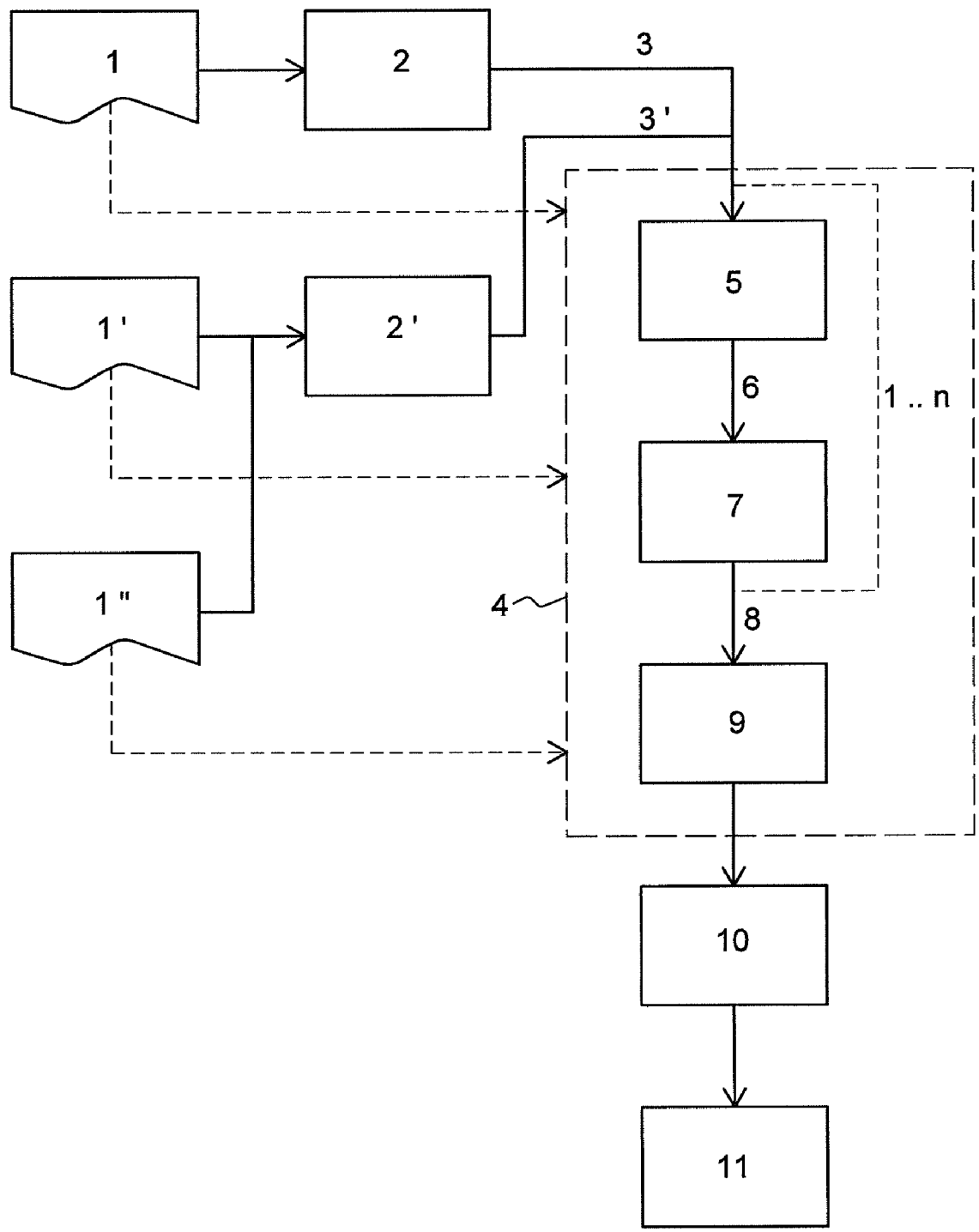
FIG. 2 shows a block diagram of an embodiment of a system and method for radio network planning according to the state of the art.

FIG. 2 shows a block diagram of an embodiment of a system for radio network planning according to the state of the art, wherein more specifically the boxes 1, 1' and 1" at the left of the figure represent the input parameters, which are classified into three distinct categories: traffic, propagation and system aspects. A subset of the traffic- and propagation-specific input parameters are used by the pre-processing modules 2 and 2', respectively a 'traffic grid generator' 2 and a 'path loss generator' 2', to provide useful input for the Monte Carlo analysis module 4, which is the core of the planning tool.

The snapshot generator 5 works repetitively so that once a snapshot 6 is evaluated, a next one is generated. So 1 . . . n snapshots 6 may be generated, where n is an arbitrary number. The input parameters 1-1" may be used in the Monte Carlo analysis module 4 for the generation and evaluation of the snapshots 6.

Input Parameters

As indicated in FIG. 2, the Input parameters 1-1" can be classified into three distinct categories, viz. traffic, propagation and system aspects. The input parameters 1-1" associated with traffic aspects include all parameters that characterise the traffic demand side, including traffic load, service mix, service characteristics (e.g. activity factor), resources (usage of downlink Orthogonal Variable Spreading Factor (OVSF) codes), service requirements (e.g. $E_b/N_0$ target, wherein $E_b$ represents bit energy and $N_0$ represents the noise and interference spectral power density, minimum throughput), user velocity and terminal aspects (e.g. terminal category, transmit power limitations, noise figure).

Some aspects of the input parameters 1-1" of specific relevance are whether or not a terminal is HSDPA-capable and if so, its category; and a propagation environment-specific mapping of experienced SNR to applied gross data rate, number of used OVSF codes and power requirement, and of experienced SNR plus applied gross data rate plus fading (~user) velocity to experienced BLER. The latter mapping includes the effects of hybrid ARQ (Automatic Repeat reQuest). In principle, all these input parameters 1-1" are of a generic nature in the sense that they are not UMTS or HSDPA specific. All parameters can be input (only) for the traffic grid generator 2.

With regard to the propagation aspects, the associated parameters 1-1" provide input for the path loss generator 2', e.g. the parameters of the path loss formula, or directly for the Monte Carlo analysis module 4, e.g. the pixel specific shadowing (slow fading) parameter and the multipath (fast) fading environment parameters (e.g. orthogonality factor, Ricean factor).

Input parameters 1-1" associated with system aspects comprise so-called Node B specifications and radio resource management parameters. The Node B specifications may include a number of parameters that can be fed into the path-loss generator, e.g. site location, antenna tilt, antenna gain, feeder/cable loss, that can be fed directly into the Monte Carlo analysis module 4.

The radio resource management parameters (RRM) 1-1" may include maximum transmit power, CPICH power, common channel power, number of HS-SCCHs (High Speed Shared Control CHannel, a downlink signalling channel associated with HSDPA), HS-SCCHs transmit power, and the number of OVSF codes available to HSDPA admission control parameters, channel switching parameters, which co-determine e.g. whether a call is handled over UMTS or HSDPA, the minimum/maximum HS-DSCH (High Speed Downlink Shared CHannel, HSDPA's data transport channel) transmit power, whether or not the sub-snapshot evaluation module 14 should allow code-multiplexing and the choice of a (packet) scheduler plus associated parameters.

The Concept of Layers

Layers are a generic concept utilized in some way or the other by practically all planning tools. To organize the input parameters 1-1" related to users such as service type, terminal type, environment (indoor/outdoor), and other information present in a planning tool it is very convenient to think in terms of layers.

A layer defines common environment and service requirements for a particular set of users in a pixel, for example voice users with a hand-held terminal and present indoors. This set of attributes together with the position of the users gives the complete definition of this user.

For example there is a pixel p having (for example) three layers. A user present in pixel p belongs to one of the three layers. Pixel p may have the following properties, position $(x_p, y_p)$ and per layer a combination of $E_b/N_0$ ($\mu$), information rate R, etc.

On the input side of the planning tool the layers can be used to e.g. assign traffic. On the output side the layers are mainly used to allow the radio network planner to obtain results valid for a certain group of users, for example when specific performance targets are set for e.g. indoor or high-priority users.

Traffic Grid Generation

The traffic grid generator 2 converts the traffic-related input parameters 1-1" into useful information for the Monte Carlo analysis module 4. The operations are best described by the information carried over the interface 3. In order to match the considered generic implementation of the Monte Carlo analysis module 4, this interface needs to be specified to some degree. In our approach, the information carried over this interface is as follows:

For each pixel in the considered network area and for each of the defined layers, the average number of users is given. Note here that in the representation of traffic by 'users', in a multiple-context scenario it could happen that several simulated users are needed to represent a single real user, e.g. when a real user has both a voice connection and a data connection ongoing at the same time.

In the Monte Carlo analysis module 4, these averages will be used as parameters of Poisson distribution, to allow random sampling of active users and thus consider a realistic variability in the number of on-going flows.

Path Loss Generation

The path loss generator 2' processes input parameters 1-1" from the propagation and system type into useful information for the Monte Carlo analysis module 4, conveyed over interface 3'. The information transported over this interface 3 is specified as follows:

For each pixel in the considered network area, a record is conveyed containing the average outdoor path losses towards all cells (as predicted by the propagation loss model). Other losses such as building penetration loss, body loss and so on are associated with the layers.

Snapshot Generation

As part of the Monte Carlo analysis module 4, the snapshot generator 5 is in charge of creating statistically independent snapshots 6. During snapshot generation 5 users are generated which are stored in the snapshot 6. The information in the snapshots 6 is specified as follows:

For each randomly generated active user, a record is conveyed containing the associated layer and its attributes as well as the local average path losses towards all cells, including the effect of layer-dependent slow fading. Local average path loss relates to a slow fading realisation in a pixel in the snapshot.

The users, statistically generated in the 'snapshot generation' module 5, can be first assigned to either a dedicated channel (DCH, UMTS R'99) or the high speed downlink shared channel (HS-DSCH, HSDPA) according to the channel assignment scheme. In a most likely implementation, the channel assignment is based purely on layer information.

DCH users make use of dedicated channels. These users are assigned a certain bit rate, which may be different in uplink and downlink, or they are blocked. A user may be downgraded if he is assigned a bit rate that is lower than its desired bit rate.

HSDPA users make use of both associated dedicated channels (for signalling purposes) and a high speed downlink or uplink shared channel. The dedicated channels are treated like those for DCH users.

Snapshot Evaluation

Figure 3:
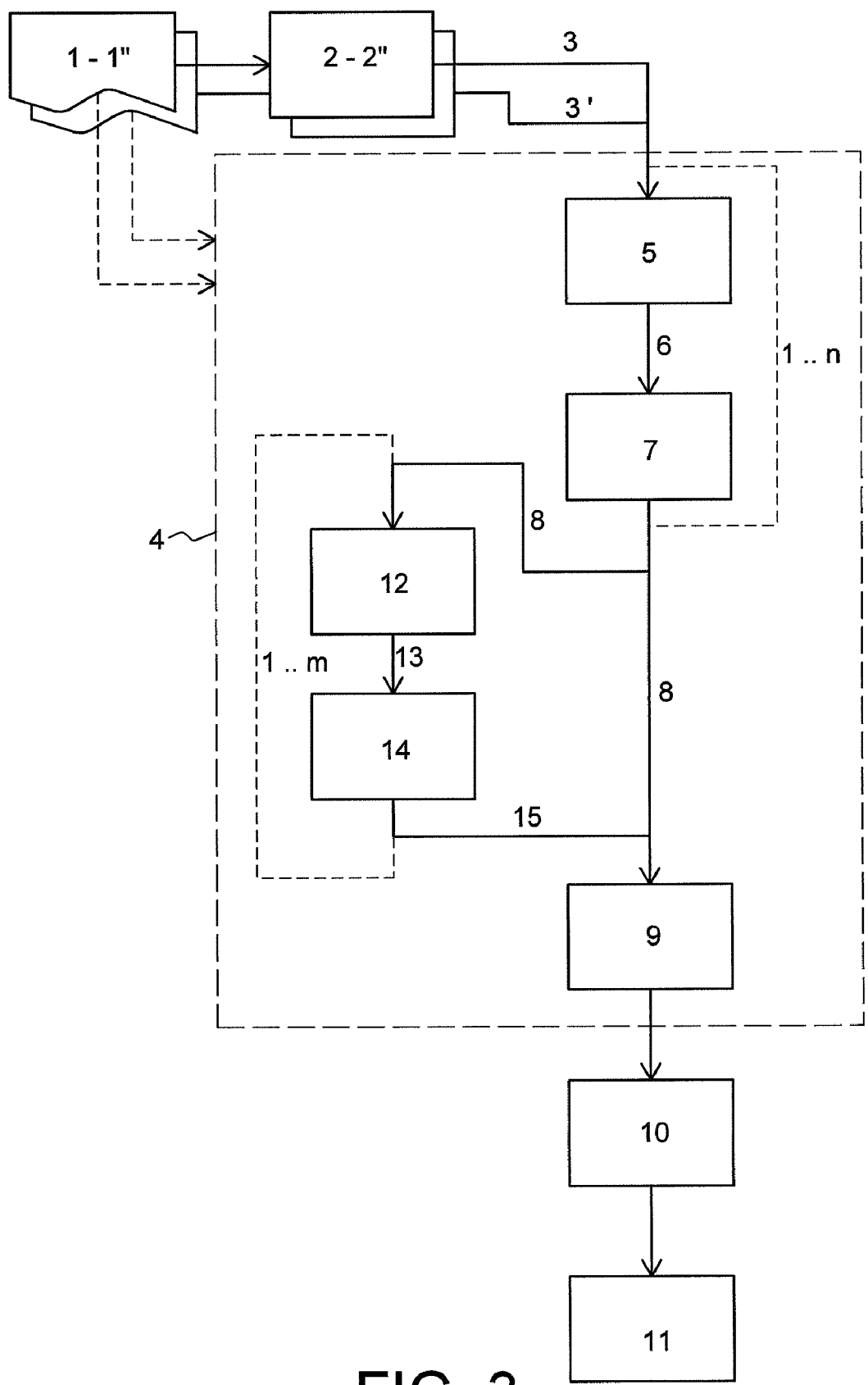
FIG. 3 shows a block diagram of an embodiment of a system and method for radio network planning according to the state of the art having sub-snapshot generation and evaluation.

As shown in FIG. 3, a snapshot 6 from the snapshot generator 5, slow fading related CDMA or UMTS related performance parameters can be evaluated by a snapshot evaluation module 7.

The snapshot evaluation module 7 calculates the power required for each DCH connection in uplink and downlink, as well as the power available for HSDPA users. The snapshot evaluation module 7 can be considered as the kernel in a Monte Carlo-based planning tool. Some modifications w.r.t. the state of the art may be necessary.

The principle applied is that DCH users can be assigned first and with the remaining power HSDPA users will be served. However, the possibility is introduced to reserve a certain minimum power exclusively for HSDPA users. The snapshot evaluation module 7 may handle priorities internally. Note however that if a HSDPA user is unable to establish its associated DCHs, it will not be able to use the HSDPA service either. In order to describe how these modules work and interact, the following definitions apply on a per-cell basis. First define a number of input parameters:

$P_{BS,max}$ represents the maximum available transmit power in a cell.

$P_{other}$ represents the total power devoted to all channels other than DCH and HSDPA, e.g. control channels, non-HDSPA shared channels, CPICH, etc.; consequently, $P_{BS,max} - P_{other}$ is then the power available to DCH and HSDPA channels.

$P_{HSDPA,min}$ represents the minimum power that is reserved to HSDPA users.

$P_{HSDPA,max}$ represents the maximum power that is reserved to HSDPA users; if all remaining power in a cell may be assigned to HSDPA users, this value may be given a very high value or ∞.

It is assumed that the HSDPA-parameters are selected such that $P_{HSDPA,min} \leq P_{HSDPA,max}$ and $P_{HSDPA,min} \leq P_{BS,max} - P_{other}$.

A number of variables are defined and are determined within the snapshot evaluation module 7 which may be used for HSDPA analysis:

$P_{DCH}$ represents the total downlink power assigned to all DCH users in a cell, including the DCHs occupied by HSDPA users;

$P_{HSDPA}$ represents the total downlink power available to the HSDPA users in a cell;

$P_{total}$ represents the total power used in the cell and is equal to $P_{other} + P_{DCH} + P_{HSDPA}$.

The snapshot evaluation module 7 will assign DCH users to a cell (or several cells in case of soft handover) on the basis of coverage, capacity and possibly RRM criteria. It will possibly mark one or more users 'in outage' and determine the power equilibrium for served users that are not 'in outage'. The result is a set of served users, the power used for each connection and the total power used in the cell. Remember that also HSDPA users have DCHs so that these must be taken into account by the snapshot evaluation module 7 as well.

As mentioned above, the snapshot evaluation module 7 is in many ways an ordinary simulation kernel as present in practically all UMTS radio planning tools based on the Monte Carlo principle.

HSDPA Analysis

Once the execution of the snapshot evaluation module 7 has reached convergence for a certain snapshot 6, the resulting cell-specific values of $P_{total}$ and $P_{HSDPA}$ are the key input parameters 8 for the HSDPA analysis that follows.

Sub-Snapshot Generation

In the snapshot generation module 5 snapshots 6 are generated in order to sample the number, type and local average path-loss conditions of active users, where 'local average' relates to the attenuation and slow (shadow) fading effects, but excludes fast (multi-path) fading effects. Recall that users are modelled as being present in pixels. The smaller the pixels become, the smaller the variation of the slow fading becomes. When going towards pixels in the size of a few square meters, the slow fading is deterministic, while the fast fading still varies.

In the evaluation of calls handled over DCHs the impact of fast fading is generally incorporated in the applied $E_b/N_0$ target values. Since the impact of fast fading in HSDPA is much more significant, due to the fast, Node B-centred, channel-aware AMC and scheduling mechanisms, it is important that the effects of fast fading are more explicitly incorporated in the evaluations. To facilitate the simulation of fast fading effects, the concept of so-called sub-snapshots 13 is introduced, according to the state of the art as disclosed in the paper by Olin et al.

FIG. 3 shows a block diagram of a system for radio network planning with HSDPA analysis having sub-snapshot generation and evaluation according to the state of the art. For each 'main' snapshot 6 analysed in the snapshot evaluation module 7, a number of associated sub-snapshots 13 (1 ... m) are generated by a sub-snapshot generator 12. Each such sub-snapshot 13 reflects an equally probable, independently sampled realisation of the fast fading effects of the HSDPA users in the associated snapshot 6, i.e. the sampled fast fading effects in the different sub-snapshots 13 are not correlated. So the pixels in the sub-snapshots remain the same, only the fast fading effect realisation is different. The fast fading effects sampled for the HSDPA users are used only for their service on the HS-DSCH. Naturally, in practice these fading effects also affect the required transmit power on the associated DCH that each active HSDPA user maintains. Since all DCHs are considered in the snapshot evaluation module 7, including these associated DCHs, the associated fast fading effects are considered there as well, viz. by means of the applied $E_b/N_0$ target.

Sub-Snapshot Evaluation

HSDPA analysis can be conducted by analysing the sub-snapshots 13 in a sub-snapshot evaluation module 14, wherein according to the state of the art, the SNR and throughput can be established for a single HSDPA user. The sub-snapshot evaluation module 14 establishes the throughputs for the HSDPA users given the available HSDPA power determined in the snapshot evaluation module 7.

It is noted that since the fast fading effects of the HSDPA users do not affect the radio resource management mechanisms incorporated in the snapshot evaluation module 7, e.g. call admission control and transmit power control, the impact of these fast fading effects on the HSDPA performance can indeed be evaluated by using these sub-snapshots 13 for a given snapshot 6. As the evaluation of a sub-snapshot 13 is much faster than that of a snapshot 6, this approach effectively saves on the number of required snapshots 6 to obtain sufficient statistical accuracy of the derived performance measures and thus significantly reduces the required computation time.

Figure 4:
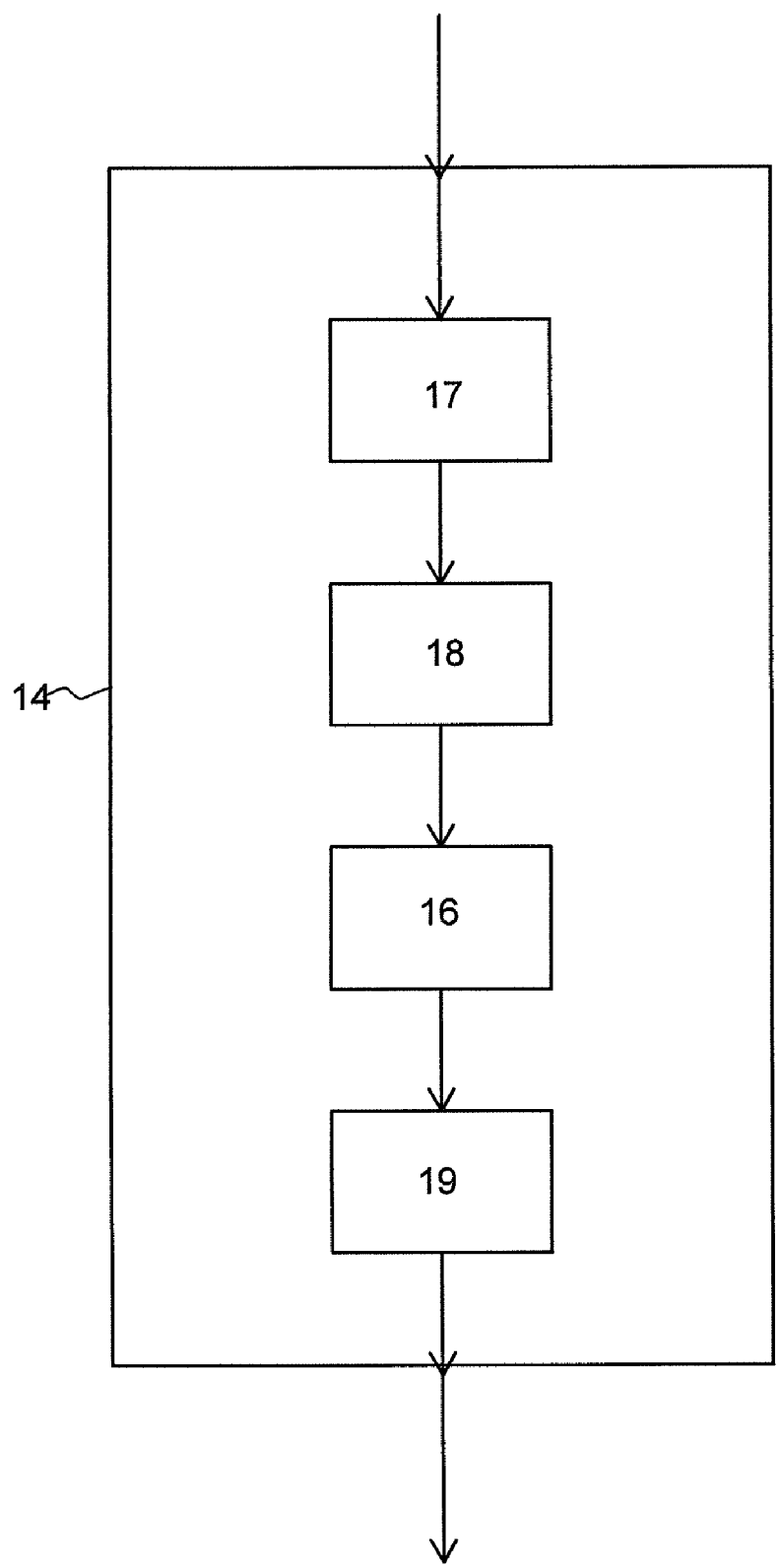
FIG. 4 shows a block diagram of a sub-snap shot evaluation module comprising a sub-scheduling according module according to an embodiment of the invention.

As part of the considered (main) snapshot and as a result of the evaluations in the snapshot evaluation module 7, the following information is available: the number of HSDPA users present in each cell, the associated average path losses and the cell-specific values of $P_{total}$ and $P_{HSDPA}$. The sub-snapshot evaluation module 14 according to the invention may comprise the following sub-modules: (see FIG. 4):

1. Resource Requirements Sub-Module 17:

The Resource requirements sub-module 17 is arranged to establish for each user the HSDPA resource requirements. These resources may be expressed in terms of bit rate, OVSF codes and power. The sub-module 17 is arranged to perform, for each HSDPA user in the sub-snapshot 13;

a. Calculate the experienced SNR on the basis of the fast fading realisation.
b. Map the experienced SNR to a reported CQI (Channel Quality Indicator).
c. Map the reported CQI to a feasible gross bit rate, the number of applied OVSF codes and a power requirement.

In b potential errors in the CQI estimation can be incorporated. Section c refers to the possibility that the experienced SNR is 'too good' for the maximum feasible bit rate associated with the considered terminal class, in which case the applied transmission power can be reduced (in case the user is selected by the scheduler module 16; see below) and is available for other HSDPA users in the same cell. The bit rate and so also the transmission power may also be reduced if the network does not support the terminal class in question. It is noted that in this step possible terminal- or network-operated 'tricks' can be incorporated, where the derived gross bit rate may be reduced to achieve a more robust channel (~'outer loop AMC').

2. Scheduler Sub-Module 16:

The Scheduler sub-module 16 according to the invention is arranged to schedule the schedulable, still unscheduled user for service. For each user the resource requirements like the applied gross bit rate, OVSF code and power requirement can be determined. This is done by assessing for a schedulable user, whether the associated gross bit rate is indeed feasible, by checking the OVSF (Orthogonal Variable Spreading Factor) code availability; only if the required number of OVSF codes does not suffice: (i) assign to this user the maximum bit rate that is still allowed from the perspective of OVSF code availability; and (ii) recalculate the required SNR and the power requirement.

In case code-multiplexing is enabled, sequentially the remaining HSDPA users and selected additional users can be considered for service, appropriately dealing with the reduced power and OVSF code availability, and recalculating SNRs and gross bit rates when necessary. The remaining HSDPA power and/or remaining OVSF codes can be tested. The scheduler sub-module 16 is arranged, according to an embodiment of the invention, to first rank the schedulable, still unscheduled HSDPA users according to a selected scheduling scheme before scheduling. The scheduling scheme may be part of the input parameters 1-1".

The most common (non-differentiating) schedulers are 'round robin', 'maximum SNR' and 'proportional fair': Under 'round robin', users may be sequentially scheduled in a random order. Under 'maximum SNR' scheduling, users are ranked according to the determined gross bit rate; in case multiple users have the same gross bit rate, they are ranked according to the power requirement; in case the power requirements are also identical, these users are ranked randomly. Under 'proportional fair' scheduling, users are ranked according to the ratio of the determined gross bit rate and the 'long-term average gross bit rate', which is calculated by applying the SNR-to-CQI-to-gross bit rate mapping to the average rather than the actual SNR, i.e. excluding the effect of fast fading.

Alternatively, differentiating schedulers can be considered, wherein a user i is characterised by a weight $\gamma_i$, which in a typical implementation is likely to be inherited from the traffic class the flow belongs to.

Under 'weighted round robin' scheduling users are ordered randomly according to the associated weights, i.e. user i is assigned probability $\gamma_i/\Sigma_j \gamma_j$. Under 'differentiated maximum SNR' scheduling, users are ranked according to the determined gross bit rate multiplied by their associated scheduling weights; in case multiple users have the same gross bit rate x scheduling weight product, they are ranked according to the power requirement; in case the power requirements are also identical, these users are ordered randomly. As an alternative to the multiplicative approach to model differentiated scheduling formulated here, an additive approach may also be considered. Under 'proportional fair' scheduling, users are ranked according to the ratio of the determined gross bit rate multiplied by the associated scheduling weight, and the 'long-term average gross bit rate', which is calculated by applying the SNR-to-CQI-to-gross bit rate mapping to the average rather than the actual SNR, i.e. excluding the effect of fast fading.

3. Inter-TTI Interval Sub-Module 18.

According to an embodiment of the invention, special steps can optionally be taken in case HSDPA users are present that cannot receive data in every TTI (Transport Time Interval), which is a terminal characteristic.

The Inter TTI interval sub-module 18 can be arranged for performing these special steps, the evaluation of which precedes the evaluation of the scheduler module 16. The results of the Inter TTI interval sub-module 18 can be used by the scheduler module 16.

a. If all HSDPA users served by the cell have minimally a single inter-TTI interval, they can be served in any TTI and all users can remain as candidates for scheduling by the scheduler sub-module 16.
b. If any HSDPA user served by the cell has more than one inter-TTI interval there is a chance that the scheduler module 16 would like to serve this user based on the reported CQI, while this user cannot be scheduled in the sub-snapshot due to its associated required minimum inter-TTI interval. The probability that this occurs depends on the number of users in the cell and the scheduling scheme. For all such users, the following evaluation is done:
   i. Under 'round robin' scheduling, if the number of HSDPA users in the cell is lower than the minimum inter-TTI interval of the HSDPA user of question, the user is marked as 'non-schedulable' with a probability equal to the number of HSDPA users in the cell divided by the user's minimum inter-TTI interval (denoted Tyr). This probability is effectuated by tossing an appropriately biased coin. Note that it is inherent to the round robin-scheduler that a user's $T_{TTI}$ does not influence its performance when there are more than $T_{TTI}$ HSDPA users in the cell. 'Non-schedulable' means that the user cannot receive any data in this sub-snapshot and therefore needs not to be considered in Steps 4 and 5 below. However, it still remains considered in the collection of statistics for the sub-snapshot (with a net bit rate of zero).
   ii. Under other types of scheduling, a HSDPA user is marked as 'non-schedulable' in this sub-snapshot with probability equal to $1/T_{TTI}$ This probability is effectuated by tossing an appropriately biased coin.

For all but the round robin scheduler it is rather difficult to incorporate the effect of a terminal's minimum inter-TTI interval adequately. For instance, under 'maximum SNR' scheduling, the minimum inter-TTI interval is likely to reduce a user's chance of being scheduled by a factor $1/T_{TTI}$ in case the user experiences a period with very favourable radio link quality, while $T_{TTI}$ is likely to have no impact in case the user endures less favourable radio link quality. Considering this difficulty and the fact that terminals with minimum inter-TTI interval larger than 1 are expected to be very rare, the rather harsh modelling (worst case approach) is accepted as proposed in the text.

4. Net Bit-Rate Evaluation Sub-Module 19.

According to an embodiment of the invention, the net bit-rate for all HSDPA users may be determined according to the following scheme:

For scheduled user i in the considered snapshot 6 s, sub-snapshot 13 ss, the net bit rate $\hat{R}$ is given by formula 1:

$$\hat{R}_i(s,ss)=R_i(s,ss)(1-BLER_i(s,ss)) \quad \text{(formula 1)}$$

where $BLER_i(s,ss)$ is the block error rate experienced by user j in sub-snapshot ss 13, which depends on the applied gross bit rate, the experienced SNR and the fading (~user) velocity. In the mapping of bit rate, SNR and fading velocity to the experienced block error rate, the effects of hybrid ARQ should be taken into account; the rationale behind this is that in practise the block error probability depends on whether a block transmission is a fresh or re-attempt due to the chase combining or incremental redundancy operation of H-ARQ. Trivially, for all non-scheduled users, the registered net bit rate is zero. The determination of the net bit-rate may be embodied in a Net bit-rate estimation sub-module 19.

Snapshot Re-Evaluation.

According to an embodiment of the invention, the sub-snapshot evaluation results 15 comprising used resources as evaluated by the sub-snapshot evaluation module 14, like OVSF codes and HSDPA power may be fed back into the snapshot evaluation module 7. For example, if, after execution of the Scheduler sub-module 16, there is still remaining HSDPA power, i.e. $P_{HSDPA}$ is not utilised in full, it is possible to re-evaluate the snapshot 6 by the snapshot evaluation module 7.

After the execution of the Scheduler sub-module 16, there are basically three options:

I. Simply proceed with the execution of the Net bit-rate calculation sub-module 19, assuming that all power was used, which means that a pessimistic estimate was made of this and other cell's capacity, since the assumed interference level is too high; or II. It is possible to proceed with the Net bit-rate calculation sub-module 19, then go back to the snapshot evaluation module 7 and, considering the cell in question only, use the now available power $(=P_{HSDPA}-\max\{P_{HSDPA,actually\ utilised}, P_{HSDPA,min}\})$ to add DCH users that were blocked or upgrade DCH users that were downgraded, as long as at least the power $P_{HSDPA,min}$ is still for HSDPA and provided that codes are available; note that there is no need for computationally intensive power control iterations; also note that the power originally assumed available for HSDPA in the sub-snapshot evaluation module 14 will not change, and that the snapshot evaluation module 7 should not be allowed to reduce the HSDPA power reservation below $P_{HSDPA,min}$ in order to accept additional DCH users, given the distinct time scales at which fast fading (and hence $P_{HSDPA,actually\ utilised}$) fluctuates and at which call admission control operates; or III. It is also possible to go back to the snapshot evaluation module 7 and restart the DCH assignment process with a smaller HSDPA power, after which the HSDPA evaluation is done again.

Finally, in the collection module 9, after having processed all sub-snapshots 13, the expected net bit rate (or throughput) can be calculated (formula 2) for HSDPA user j in the main snapshot by averaging all expected net bit rates in the S sub-snapshots 13, i.e.

$$\hat{R}_i(s) = \frac{1}{S}\sum_{ss=1}^{S}\hat{R}_i(s,ss) \quad \text{(formula 2)}$$

State Machine

Figure 5:
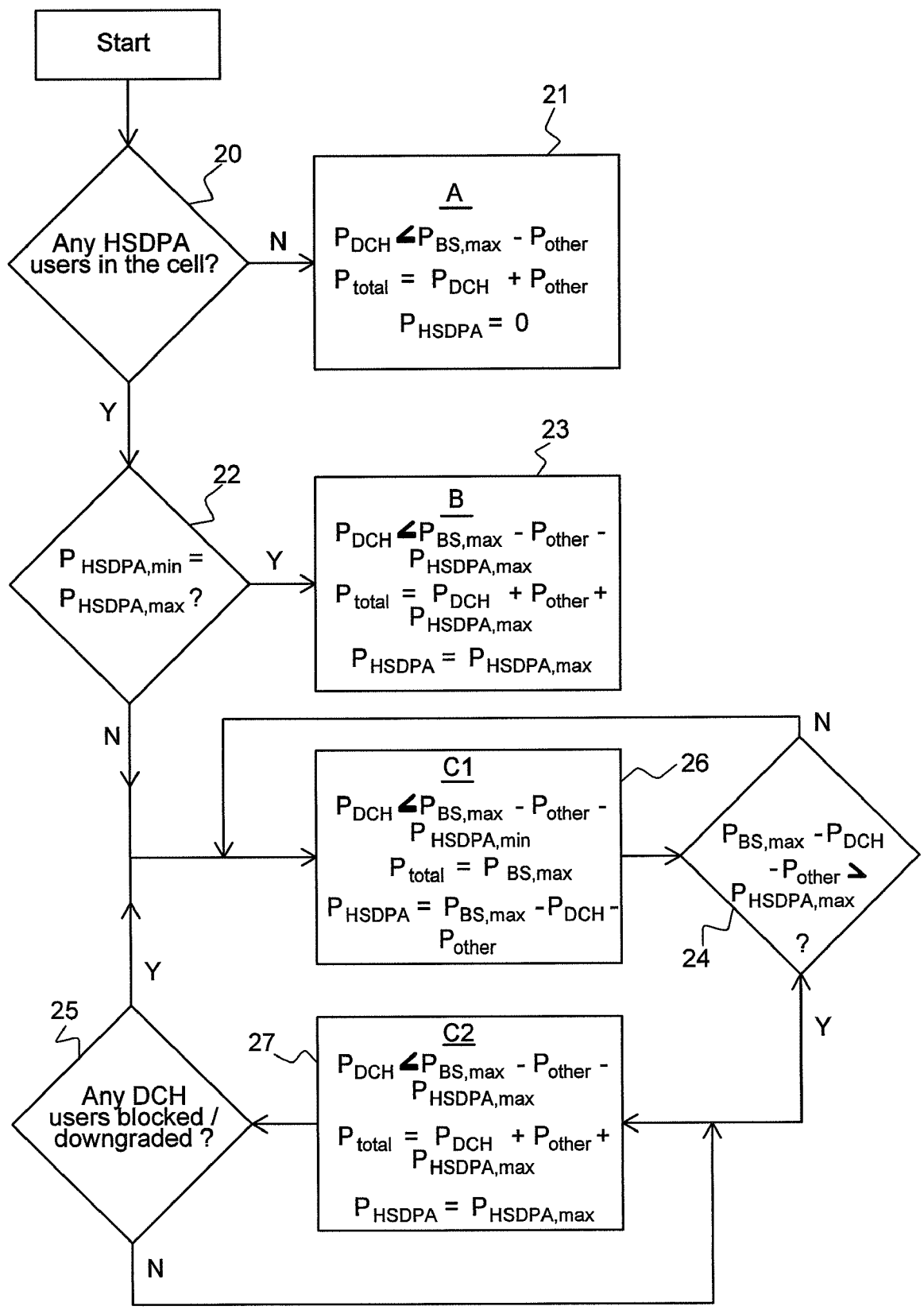
FIG. 5 shows a state diagram of a snapshot evaluation module according to an embodiment of the invention.

The system for radio network planning can be further improved according to an embodiment of the invention, wherein the snapshot evaluation module 7 comprises a state machine sub-module. The state machine sub-module distinguishes a number of states a cell can take. The state machine sub-module is executed for each cell, whereby a cell is associated with a base station. Several cells may be associated with the same base station. FIG. 5 shows a flowchart of how the states are established in the state machine sub-module.

Depending on the state a cell is in, certain actions need to be taken. These states can be:

'Alpha' (A) 21: A cell is in this state if no HSDPA users are present in the cell (FIG. 5, condition 20). The conventional snapshot evaluation module 7 can evaluate this cell just as usual, i.e. the power equilibrium calculations are readily executed.

'Bravo' (B) 23: A cell is in state if there are HSDPA users in the cell and a fixed power is allocated to HSDPA. In terms of the previously introduced parameters this means that $P_{HSDPA,min}=P_{HSDPA,max}$ (condition 22). This option can be introduced in the conventional snapshot evaluation module 7, since the HSDPA-power can be handled as any other fixed power (e.g. CPICH) in the assignment and interference calculations.

'Charlie' (C) 26, 27: In these states the power assigned to HSDPA is variable between the minimum $P_{HSDPA,min}$ and the maximum $P_{HSDPA,max}>P_{HSDPA,min}$. DCH users are assigned as long as there is at least a power equal to $P_{HSDPA,min}$ left for HSDPA. The power available for HSDPA is then equal to the remaining base station power, but never more than $P_{HSDPA,max}$.

Studying state Charlie 26, 27 in more detail, a distinction can be made between two sub-states:

'Charlie One' (C1) 26: In this state the base station is transmitting with its maximum power. In other words, all power resources not used for DCHs can be assigned to HSDPA users, considering the upper bound imposed by $P_{HSDPA,max}$. Hence $P_{HSDPA,max} \geq P_{HSDPA}=P_{BS,max}-P_{DCH}-P_{other} \geq P_{HSDPA,min}$ and thus $P_{DCH} \leq P_{BS,max}-P_{other}-P_{HSDPA,min}$.

'Charlie Two' (C2) 27: In this state some available transmit power remains unused, viz. because the HSDPA users are assigned their maximum power $P_{HSDPA,max}$ while the base station is transmitting with less than its maximum power $P_{BS,max}$. The power available for DCH users is then $P_{DCH} \leq P_{BS,max}-P_{other}-P_{HSDPA,max}(<P_{BS,max}-P_{other}-P_{HSDPA,min})$.

Because of the interaction between cells, a cell may shift between the states Charlie One 26 and Charlie Two 27. For example, suppose that a high level of inter-cell interference is caused by high activity in a nearby cell. Then the cell of interest may initially assume state Charlie One 26. The assignment loop may find that users in the nearby cell need to be dropped or downgraded because of too high interference. This will also reduce the interference level in the reference cell, and if the reduction is large enough it will be shifted to state Charlie Two 27. This can go on for some time. Actually, it is not guaranteed that all cells will converge to state Charlie One 26 or Two 27. If it happens that a cell flips between these states many times, it probably means that both outcomes are about equally probable. It is therefore proposed that after flipping a given number of times (a parameter to be decided in tests after observing how often the flip takes place), a permanent state is chosen for the rest of the snapshot 6 evaluation.

The criteria to be used for switching between the states Charlie One 26 and Two 27 can be defined as follows:

A cell switches from state Charlie Two 27 if during evaluation it happens that the power $P_{BS,max}-P_{DCH}-P_{other}>P_{HSDPA,max}$ (condition 24). The interpretation of this is that not all power of the base station is required, even after assigning the maximum HSDPA-power. This is in the function of state Charlie Two 27.

A cell switches from state Charlie Two 27 to state Charlie One 26 if there are blocked or downgraded DCH users in the cell (condition 25). The interpretation is that if DCH users are dropped or downgraded, then the HSDPA users should not receive the maximum power anymore. Instead some of this power should be allocated to DCH users. This is the function in state Charlie One 26.

The snapshot evaluation module 7 produces a number of results 8, some of which are used by the sub-snapshot evaluation module 14:

The power used for the HSDPA users in the cell, which depends on which state the cell has when the evaluation of the snapshot evaluation module 7 has finished as follows:
State Alpha: $P_{HSDPA}=0$.
State Bravo: $P_{HSDPA}=P_{HSDPA,min}=P_{HSDPA,max}$.
State Charlie One: $P_{HSDPA}=P_{BS,Max}-P_{DCH}-P_{other}$.
State Charlie Two: $P_{HSDPA}=P_{HSDPA,max}$.

Note that in all states, the snapshot evaluation module 7 needs to take into account the interference produced by the HSDPA users. This is easily done since the power used for HSDPA users in each cell is given by its state as indicated above.

The HSDPA users that have also been assigned their corresponding DCH-channels. Only these users may actually be served in the sub-snapshot evaluation module 14. The snapshot evaluation module 7 may incorporate a function for prioritising between different kinds of DCH users, giving preference to e.g. the associated DCHs of HSDPA users.

Cells which arrive in state Alpha 21 or Bravo 23 when beginning execution of the state machine sub-module will always stay in these states. Only for the other cells continuous monitoring and a possible change of state is required by the state machine sub-module. Depending on how the state machine sub-module is implemented, this can be solved in several ways. For example, a state check could be made after each change of DCH user allocations in a cell. Alternatively, it is only made after DCH users have been allocated in all cells.

Performance Results

Results can be presented by the output module 11 as either plots or statistics. A plot is used to illustrate results per pixel by filling this pixel with a certain colour, or showing a result for a cell, whereby the whole Best Server Area is filled by a certain colour. In each case the colour corresponds to a value. Statistics are used to illustrate aggregated results by showing numbers in a table. For the radio network planner, some results are more suited to be visualised in plots and others to be presented in tables.

Given all variables and events in the simulator there is an enormous amount of results that can hypothetically be displayed. Only a subset of these, however, is actually useful for a radio network planner. Furthermore, the philosophy of the planning tool influences how certain results are available or can be used. Finally, the radio planner has his own preferences.

The results are obtained by the post processing module 10. The results relate to the snapshots 6 and the sub-snapshots 13 in the Monte Carlo analysis module 4 either on a user level, since individual users are sampled in each snapshot 6, or on a cell level, since individual cells are analysed. It is clear that the system for radio planning does not need this detailed snapshot-specific information. Instead the results are averaged over all snapshots 6 and sub-snapshots 13. They can be aggregated per layer in each pixel (remember, a layer is a certain combination of characteristics such as service type, terminal type and environment), per layer over the entire network, over all layers in each cell, etc. It is important to realise that in principle all kind of aggregations are possible, whereas in reality some aggregations are more useful than others.

Examples of basic performance measures for HSDPA traffic, obtainable per sub-snapshot 13 according to their classification are:

user connection failure: if a HSDPA connection cannot be set up at all, this is referred to as a user connection failure. The probability of a failure depends on the pixel and the layer.

user performance: when a HSDPA connection can be set up, it will have a certain experienced performance from the perspective of a user, depending on pixel and layer.

cell performance: the average performance that can be expected from the perspective of a certain cell is derived by considering all HSDPA connections set up in the cell.

Cell level results can be illustrated through plots by giving the Best Server Area of each cell a colour, or they can be collected in tables.

With regard to aggregation possibilities for the cell level results, the cell throughput and cell efficiency measures can be aggregated for a group of cells, e.g. a specific region or metropolitan area, or for the entire network.

The system may be implemented using a computer with a processor, memory, data storage, input means, such as mouse and keyboard and a display means such as a CRT screen or the like. The input parameters 1-1" may be stored in the data storage. The memory may comprise a computer program implementing the modules as mentioned in this specification, whereby in operation, the processor may execute the computer program as to fulfil the various functions in the module as described in the description above. Results of the output module 11 may be displayed on the display means.

In the foregoing specification, the invention has been described with reference to specific examples of embodiments according to the invention. It will, however, be evident that modifications and changes can be made therein without departing from the scope of the invention as set forth in the appending claims.

The invention claimed is:

1. A system for radio network planning, comprising:
at least one grid generator, arranged for generating a map of pixels, each pixel representing a radio network area having at least one of a plurality of radio network input parameters, the parameters representing a radio network having at least one cell and at least one user, and
a Monte Carlo analysis module, comprising:
i) a snapshot generation module, arranged for generating a plurality of snapshots, each snapshot comprising the map of pixels, wherein for each snapshot and for each pixel a statistical realization is drawn from a distribution function relating to at least one of the input parameters, ii) a snapshot evaluation module, arranged for establishing radio network performance parameters for each pixel of the plurality of snapshots, iii) a sub-snapshot generation module, arranged for generating at least one sub-snapshot for each evaluated snapshot result, wherein a statistical realization is drawn from a distribution function relating to fast fading within the snapshot, and iv) a sub-snapshot evaluation module for establishing high speed downlink packet access (HSDPA) performance parameters based on the sub-snapshot, wherein the sub-snapshot evaluation module comprises a scheduler sub-module, which is arranged for scheduling a user according to a scheduling criterion.

2. The system according to claim 1, wherein the sub-snapshot evaluation module comprises a resource requirements sub-module for establishing at least one HSDPA resource requirement for the at least one user, and wherein the scheduling criterion comprises the HSDPA resource requirement.

3. The system according to claim 1, wherein the scheduler sub-module is further arranged to establish a ranking of users before scheduling according to a scheduling scheme, and wherein the scheduler sub-module is further arranged for scheduling each user according to the ranking.

4. The system according to claim 1, wherein the at least one HSDPA resource requirement comprises a required HSDPA power.

5. The system according to claim 1, wherein the snapshot generation module draws a statistical realization for each pixel from a user density distribution function.

6. The system according to claim 1, wherein the snapshot generation module draws a statistical realization for each pixel from a slow fading distribution function.

7. The system according to claim 1, wherein the sub-snapshot evaluation module further comprises an inter-transport time interval (inter-TTI) interval sub-module for applying minimum inter TTI terminal effects, the results of which are used by the Scheduler sub-module.

8. The system according to claim 1, wherein the sub-snapshot evaluation module further comprises a net bit-rate calculation sub-module, for calculating the net bit-rate for all HSDPA users.

9. The system according to claim 1, wherein the sub-snapshot evaluation module is arranged to feed back the used resources into the snapshot evaluation module and re-evaluate the snapshot related performance parameters.

10. The system of claim 1, wherein the snapshot evaluation module further comprises a state machine sub-module for establishing an evaluation state per cell in the snapshot depending on the number of HSDPA users and the HSDPA power limits in the cell.

11. A method for radio network planning, comprising the steps of:
generating at least one map of pixels, each pixel representing a radio network area having at least one of a plurality of radio network input parameters, the parameters representing a radio network having at least one cell and at least one user, and
performing Monte Carlo analysis on the at least one map of pixels, the Monte Carlo analysis comprising the steps of:
i) generating a plurality of snapshots, wherein for each snapshot of the plurality of snapshots a statistical realization is drawn from a distribution function at least relating to slow fading,
ii) evaluating each of the plurality of snapshots, by establishing radio network performance parameters for each pixel of the plurality of snapshots,
iii) generating for each snapshot of the plurality of snapshots at least one sub-snapshot, wherein a statistical realization is drawn from a distribution function relating to fast fading in the snapshot, and
iv) evaluating each of the plurality of sub-snapshots, by establishing high speed downlink packet access (HSDPA) performance parameters based on the sub-snapshot,
wherein the step of evaluating each of the plurality of sub-snapshots comprises scheduling a user according to a scheduling criterion.

12. The method according to claim 11, wherein the step of evaluating each of the plurality of sub-snapshots further comprises establishing for the at least one user at least one HSDPA resource requirement, and wherein the scheduling criterion comprises the at least one HSDPA resource requirement.

13. The method according to claim 11, wherein the step of scheduling further comprises establishing a ranking of users before scheduling according to a scheduling scheme, and scheduling each user according to the ranking.

14. The method according to claim 11, wherein the at least one HSDPA resource requirement comprises a required HSDPA power.

15. The method according to claim 11, wherein the step of snapshot generation comprises the step of drawing a statistical realization for each pixel from a user density distribution function.

16. The method according to claim 11, wherein the step of snapshot generation comprises drawing a statistical realization for each pixel from a slow fading distribution function.

17. The method according to claim 11, wherein the step of sub-snapshot evaluation further comprises applying minimum inter-transport time interval (inter-TTI) terminal effects the results of which are used by scheduler sub-module during the scheduling step.

18. The method according to claim 11, wherein the step of sub-snapshot evaluation further comprises the step of calculating a net bit-rate for all HSDPA users.

19. The method according to claim 11, wherein the step of sub-snapshot evaluation comprises feeding back the used resources into a snapshot evaluation module, which performs the step of evaluating each of the plurality of snapshots, and re-evaluating the snapshot related performance parameters.

20. The method according to claim 11, wherein the step of snapshot evaluation further comprises establishing an evaluation state per cell in the snapshot depending on the number of HSDPA users and the HSDPA power limits in the cell.

21. A non-transitory computer readable medium comprising a computer executable program, which program when loaded and executed in a computer is fit for performing the steps of:
generating at least one map of pixels, each pixel representing a radio network area having at least one of a plurality of radio network input parameters, the parameters representing a radio network having at least one cell and at least one user, and
performing Monte Carlo analysis on the at least one map of pixels, the Monte Carlo analysis comprising the steps of:
i) generating a plurality of snapshots, wherein for each snapshot of the plurality of snapshots a statistical realization is drawn from a distribution function at least relating to slow fading,
ii) evaluating each of the plurality of snapshots, by establishing radio network performance parameters for each pixel of the plurality of snapshots,
iii) generating for each snapshot of the plurality of snapshots at least one sub-snapshot, wherein a statistical realization is drawn from a distribution function relating to fast fading in the snapshot, and iv) evaluating each of the plurality of sub-snapshots, by establishing high speed downlink packet access (HSDPA) performance parameters based on the sub-snapshot, wherein the step of evaluating each of the plurality of sub-snapshots comprises scheduling a user according to a scheduling criterion.

* * * * *

UNITED STATES PATENT AND TRADEMARK OFFICE
CERTIFICATE OF CORRECTION

PATENT NO. : 8,209,038 B2  
APPLICATION NO. : 12/301971  
DATED : June 26, 2012  
INVENTOR(S) : Nils Anders Stefan Gustafsson and Remco Litjens Page 1 of 1

It is certified that error appears in the above-identified patent and that said Letters Patent is hereby corrected as shown below:

On the Title page

Item [75] Inventors: "Voorschuten" should be --Voorschoten--.

Signed and Sealed this
Twenty-eighth Day of August, 2012

David J. Kappos
*Director of the United States Patent and Trademark Office*